(12) United States Patent
Fudali et al.

(10) Patent No.: US 8,319,735 B2
(45) Date of Patent: Nov. 27, 2012

(54) USER INTERFACE FOR DIAGNOSTIC INSTRUMENT

(75) Inventors: Thomas M. Fudali, McHenry, IL (US); Timothy J. Raml, Pewaukee, WI (US); William D. Nicholson, Waukesha, WI (US)

(73) Assignees: Snap-On Technologies, Inc., Lincolnshire, IL (US); Autologic, L.L.C., Sussex, WI (US)

( * ) Notice: Subject to any disclaimer, the term of this patent is extended or adjusted under 35 U.S.C. 154(b) by 1123 days.

(21) Appl. No.: 10/674,409

(22) Filed: Oct. 1, 2003

(65) Prior Publication Data

US 2005/0073503 A1 Apr. 7, 2005

(51) Int. Cl.
*G06F 3/041* (2006.01)
(52) U.S. Cl. ....................................................... 345/173
(58) Field of Classification Search .......... 345/173–179; 715/810, 841–843; 178/18.01, 19.04
See application file for complete search history.

(56) References Cited

U.S. PATENT DOCUMENTS

| | | | | |
|---|---|---|---|---|
| 5,598,527 A * | 1/1997 | Debrus et al. | ................. | 345/173 |
| 5,859,628 A * | 1/1999 | Ross et al. | ................... | 345/173 |
| 6,028,581 A * | 2/2000 | Umeya | ......................... | 345/104 |
| 6,310,610 B1 * | 10/2001 | Beaton et al. | ................ | 345/173 |
| 6,314,422 B1 * | 11/2001 | Barker et al. | ................ | 715/206 |
| 6,433,801 B1 * | 8/2002 | Moon et al. | .................. | 715/840 |
| 6,603,494 B1 * | 8/2003 | Banks et al. | ................. | 715/807 |
| 6,615,160 B1 * | 9/2003 | Quinnett et al. | ............ | 702/185 |
| 6,801,849 B2 * | 10/2004 | Szukala et al. | ............... | 701/114 |
| 7,123,243 B2 * | 10/2006 | Kawasaki et al. | ............ | 345/173 |
| 7,154,481 B2 * | 12/2006 | Cross et al. | ................... | 345/173 |
| 7,477,243 B2 * | 1/2009 | Ogawa et al. | ................ | 345/204 |
| 2001/0030668 A1 * | 10/2001 | Erten et al. | .................... | 345/863 |
| 2004/0212586 A1 * | 10/2004 | Denny, III | .................... | 345/156 |

* cited by examiner

*Primary Examiner* — Joe H Cheng
(74) *Attorney, Agent, or Firm* — McDermott Will & Emery LLP

(57) ABSTRACT

A user interface for a computing device is provided. The user interface includes a plurality of display elements. A display element includes an active region, a graphical representation, and a textual description. The active region is sized for enabling human finger tip selection of the display element on a touch sensitive display screen. A display module receives coordinate information from the display screen and determines whether the coordinate information corresponds to the active region. When a user touches the active region, an instrument interface module sends a command to a diagnostic instrument. Further features, such as language localization of the textual description, are also provided.

8 Claims, 6 Drawing Sheets

USER INTERFACE FOR DIAGNOSTIC INSTRUMENT

TECHNICAL FIELD

The present disclosure relates generally to a user interface for a computing device, and more particularly, to a user interface for a handheld computing device configured to interface with a diagnostic instrument.

BACKGROUND

Handheld computing devices, such as personal digital assistants and pocket PCs, provide a convenient platform for communicating with diagnostic instrumentation. The portability and flexibility of a handheld computing device enables a technician to use a diagnostic instrument quickly and easily. For example, in an automotive service facility, a handheld computing device can be easily coupled to a vehicle's on-board diagnostic system for testing or problem diagnosis.

Conventionally, handheld computing devices include touch sensitive display screens that are operated with a stylus. The stylus typically has a polished or smooth plastic end that is designed to contact the display screen surface. A typical software user interface requires a user to tap the stylus on the appropriate screen element to navigate through various menu bar options or icon selections. Further, the stylus may be needed to enter data, such as customer information, into the handheld computing device.

One problem with using a stylus in a vehicle service facility or other harsh environment is that the stylus can be easily misplaced. Because the icons, menu bar, or other screen elements in a conventional user interface require a relatively small contact area to function properly, operating the device without a stylus can be challenging. In the interest of being able to use the device without a stylus, a technician could substitute another handy shop item such as a sharp screw or screwdriver for the blunt tip stylus. Of course, the plastic screen of the handheld computing device is not designed to be contacted with sharp instruments and can become damaged accordingly.

Further, service facility technicians commonly wear hand protection that can make using the stylus cumbersome. A handheld computing device typically has a small groove in which the stylus is stored. Even if the stylus is not lost and is properly stored in the device, a technician wearing work gloves may find it difficult to retrieve and to use the stylus. Additionally, the technician may find it difficult to replace the stylus into the small groove—a condition which worsens the problem of misplacing the stylus.

What is needed is a user interface for a handheld computing device that can provide functionality without the continuous use of a stylus or similar pointing device. What is further needed is a system and method for operating a diagnostic instrument using the user interface.

SUMMARY OF THE DISCLOSURE

In one aspect, a user interface is displayed on a touch sensitive display screen. The user interface enables an operator or technician to invoke functions of a diagnostic instrument. The user interface includes a first navigational menu and a second navigational menu. The navigational menus include one or more display elements. A display element has a touch sensitive active region for enabling human finger tip selection of the display element. The second navigational menu can include a selection group related to a test suite of the diagnostic instrument.

In another aspect, a method for operating a diagnostic instrument includes providing a user interface on a display screen. The user interface includes one or more display elements. The display elements include active regions that correspond in size to a human finger tip contact area. This enables a technician to operate the diagnostic instrument without the stylus typically associated with a handheld computing device. For example, a command can be sent to the diagnostic instrument when the technician touches a display element with his or her gloved finger.

In a further aspect, a computing device includes a user interface module, a display module, and an instrument interface module. The user interface module provides a user interface on a display screen that includes one or more display elements. The display elements include active regions that correspond in size to a human finger tip contact area. The display module determines whether the user has touched an active region of the display screen in order to select a display element. The instrument interface module sends data to the diagnostic instrument when the user selects a displayed function. For example, if the technician taps his or her finger tip on the "Two-speed Idle" display element, the instrument interface module sends a command to the instrument to begin the two-speed idle test sequence.

Additional aspects and advantages of the present disclosure will become readily apparent to those skilled in this art from the following detailed description, wherein only exemplary embodiments of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The accompanying drawings illustrate several embodiments and, together with the description, serve to explain the principles of the present disclosure.

DETAILED DESCRIPTION OF THE EMBODIMENTS

The present disclosure is now described more fully with reference to the accompanying figures, in which several embodiments are shown. The embodiments described herein may include or be utilized with any appropriate engine having an appropriate voltage source, such as a battery, an alternator and the like, providing any appropriate voltage, such as about 12 Volts, about 42 Volts and the like. The embodiments described herein may be used with any desired system or engine. Those systems or engines may comprises items utilizing fossil fuels, such as gasoline, natural gas, propane and the like, electricity, such as that generated by battery, magneto, solar cell and the like, wind and hybrids or combinations thereof. Those systems or engines may be incorporated into another systems, such as an automobile, a truck, a boat or ship, a motorcycle, a generator, an airplane and the like.

One skilled in the art will recognize that methods, apparatus, systems, data structures, and computer readable media implement the features, functionalities, or modes of usage described herein. For instance, an apparatus embodiment can perform the corresponding steps or acts of a method embodiment.

A. System Overview

Figure 1:
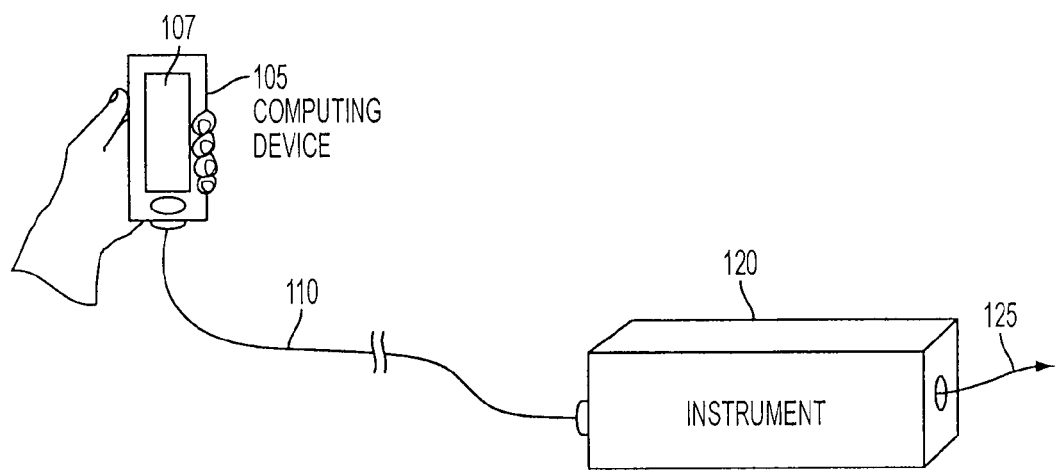
FIG. 1 illustrates an operating environment for an embodiment of the present disclosure.

FIG. 1 illustrates an operating environment for an embodiment of the present disclosure. The illustrated embodiment includes a computing device 105 and an instrument 120. The computing device 105 and the instrument 120 are operatively coupled via a communication link 110. The computing device 105 sends data to and receives data from the instrument 120 via the communication link 110. In one embodiment, the communication link 110 includes one or more wireline communications paths for communicating data between the computing device 105 and the instrument 120. Various protocols or signaling techniques can be used with the communication link 110. For example, typical serial data interfaces (e.g., RS-232, universal serial bus, or IEEE 1394), instrument interfaces (e.g., general purpose instrument bus) or onboard diagnostic system interfaces (e.g., OBD-II) can be used. In another embodiment, the computing device 105 and the instrument 120 can communicate or exchange data wirelessly. Radio frequency (RF) or infrared (IR) communications protocol can be used.

The computing device 105 includes a display screen 107. In one embodiment, the display screen 107 is a conventional liquid crystal display (LCD) with touch screen capabilities. That is, the display screen 107 is pressure sensitive and provides coordinate information about contact on the screen display. Coordination information can include planar positional information (e.g., X-axis and Y-axis coordinates). Depending on the particular characteristics of the display screen 107, the coordinate information can also include depth information (e.g., a Z-axis coordinate) that can be used to determine the pressure that is being applied to the display screen 107. The pressure can be used to define further the contact area or point. One skilled in the art will appreciate that many suitable technologies can be used for the display screen 107, for example, a light emitting diode (LED), organic LED, cathode ray tube (CRT), or a plasma display panel (PDP). Additionally, many suitable technologies can be used for the touch screen portion of the display screen 107, for example, capacitive, resistive, acoustic, or infrared.

In one embodiment, the computing device 105 is a conventional handheld computer, such as a Compaq Ipaq (which is commercially available from Hewlett-Packard, Palo Alto, Calif.) or a Palm Zire (which is commercially available from Palm, Inc., Milpitas, Calif.). Further features and functionalities of the computing device 105 are described below and with reference to FIG. 2.

In an embodiment, the instrument 120 is a diagnostic instrument such as those used in the maintenance, service, or repair of automobiles, trucks, engines, vessels, motorcycles, generators, aircraft and the like. One skilled in the art will appreciate, however, that the instrument 120 need not be distinct from the equipment and can represent, for example, onboard or integrated diagnostic, performance, or testing functionality.

In the illustrated embodiment, the instrument 120 includes a test lead 125. The test lead 125 provides input signals to the instrument 120. For example, in an exhaust gas analyzer, the test lead 125 provides a sample of the exhaust gases to the instrument 120 for analysis. The test lead 125 can also provide electrical signals to the instrument 120. The test lead 125 may include a plurality of electrical or mechanical connections that can be coupled to various components of the device under test (e.g., an automobile). One skilled in the art will appreciate that the organization or structure of the test lead 125 need not be exclusively mechanical or electrical. That is, in an embodiment, the test lead 125 can include both electrical and mechanical portions. Returning the example above in an exhaust gas analyzer, the test lead 125 may include a mechanical portion for sampling exhaust gases as well as an electrical portion for connection to the automobile's oxygen sensor or onboard diagnostic interface. Although the test lead 125 is singularly illustrated in FIG. 1, a plurality of test leads may be used concurrently or separately with the instrument 120.

B. Computing Device

Figure 2:
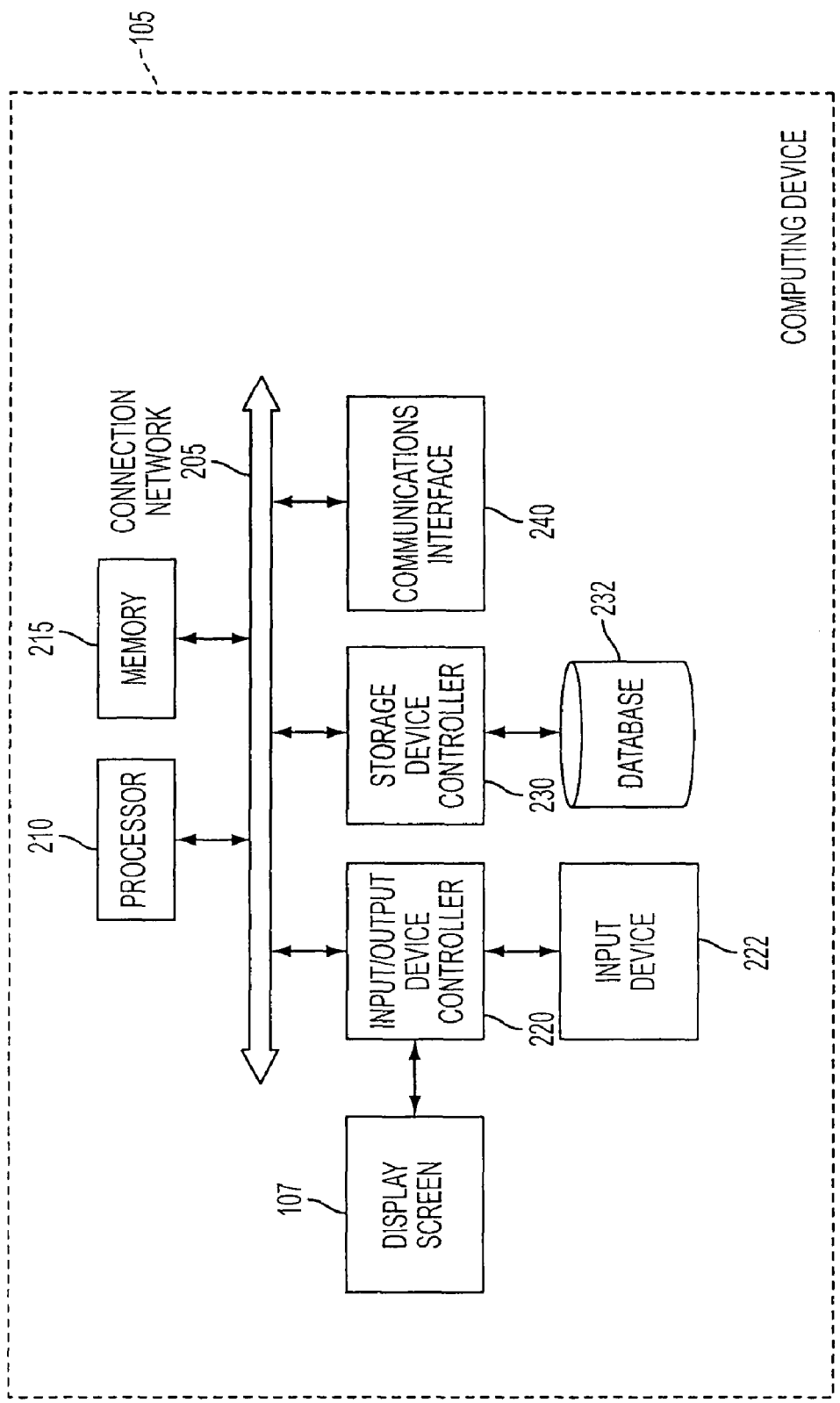
FIG. 2 is a block diagram of a computing device according to an embodiment of the present disclosure.

FIG. 2 is a block diagram of a computing device according to an embodiment of the present disclosure. The illustrated exemplary embodiment of the computing device 105 includes a display screen 107, a connection network 205, a processor 210, a memory 215, an input/output device controller 220, an input device 222, a storage device controller 230, a database 232, and a communications interface 240.

The connection network 205 operatively couples each of the display screen 107, the processor 210, the memory 215, the input/output device controller 220, the storage device controller 230, and the communications interface 240. The connection network 205 can be an electrical bus, switch fabric, or other suitable interconnection system.

The processor 210 is a conventional microprocessor. In one embodiment, the computing device 105 is portable and powered by a battery. In this instance, the processor 210 may be designed for low power operation in order to provide satisfactory runtime before requiring recharging or replacement of the battery. In a typical service facility, satisfactory runtime is approximately 8 hours or the duration of a technician's shift.

The processor 210 executes instructions or program code modules from the memory 215. The operation of the computing device 105 is programmable and configured by the program code modules. Such instructions may be read into memory 215 from another computer readable medium, such as a device coupled to the storage device controller 230. Execution of the sequences of instructions contained in the memory 215 causes the processor 210 to perform the method or functions described herein. In alternative embodiments, hardwired circuitry may be used in place of or in combination with software instructions to implement aspects of the disclosure. Thus, embodiments of the disclosure are not limited to any specific combination of hardware circuitry and software. The memory 215 can be, for example, one or more random access memory (RAM) devices, flash RAM, or electronically erasable programmable read only memory (EEPROM) devices. The memory 215 may also be used for storing temporary variables or other intermediate information during execution of instructions by processor 210.

The term "computer readable medium" as used herein refers to any medium that participates in providing instructions to the processor 210 for execution. Such a medium may take many forms, including but not limited to, non-volatile media, volatile media, and transmission media. Non-volatile media includes, for example, optical or magnetic disks, such as those controlled by the storage device controller 230. Volatile media includes dynamic memory, such as the memory 215. Transmission media includes coaxial cables, copper wire and fiber optics, including the wires or communication paths that comprise the connection network 205. Transmission media can also take the form of acoustic or light waves, such as those generated during radio wave and infrared data communications.

Common forms of computer readable media include, for example, a floppy disk, a flexible disk, hard disk, magnetic tape, or any other magnetic medium, a CD-ROM, any other optical medium, punch cards, paper tape, any other physical medium with patterns of holes, a RAM, a programmable ROM (PROM), an electrically PROM (EPROM), a flash EPROM, any other memory chip or cartridge, a carrier wave, or any other medium from which a data processing system can read.

Various forms of computer readable media may be involved in carrying one or more sequences of one or more instructions to the processor 210 for execution. For example, the instructions may initially be carried on a magnetic disk of a remote data processing system, such as a server. The remote data processing system can load the instructions into its dynamic memory and send the instructions over a communication link. The communications interface 240 can receive the data from the communication link and place the data on the connection network 205. The connection network 205 can then carry the data to the processor 210 for execution.

The input/output device controller 220 provides an interface to the display screen 107 and the input device 222. The display screen 107 can include associated hardware, software, or other devices that are needed to generate a screen display. The display screen 107 may also include a controller or other device for detecting contact with the display screen 107 and for providing coordinate information related to the area or point of contact. The coordinate information can be sent to the input/output device controller 220 for processing or forwarding to the processor 210. For example, when a user's finger tip touches the display screen 107, coordinate information is sent to the processor 210 that indicates the location at which the user's finger contacted the surface of the display screen 107.

The illustrated embodiment also includes an input device 222 operatively coupled to the input/output device controller 220. The input device 222 can be, for example, an external or integrated keyboard. In an automotive service environment, for example, it may be convenient for a technician to enter customer or vehicle information using the input device 222. Of course, customer or vehicle information can also be transmitted to the computing device 105 by the instrument 120 or another device such as a server (not illustrated). In one embodiment, the communications interface 240 can receive such information and can send the information to the processor 210 via the connection network 205.

The storage device controller 230 can be used to interface the processor 210 to various memory or storage devices. In the illustrated embodiment, a database 232 is shown for storing customer information, test results, and the like. As one skilled in the art will appreciate, the database 232 can be implemented on any suitable storage medium, such as magnetic, optical, or electrical storage. Additionally, the database 232 may store and retrieve information that is used by one or more of the functional modules described below and with reference to FIG. 3.

The communications interface 240 provides bi-directional data communication coupling for the computing device 105. In one embodiment, the communications interface 240 provides an electrical, radio frequency, or optical input and converts signals received on the input to a format suitable for transmission on the connection network 205. In one embodiment, the communication link 110 is coupled to the computing device 105 via the communications interface 240. In an example where the communications link 110 represents a USB cable, the communications interface 240 receives data from the instrument 120 in the USB protocol and places the data onto the connection network 205 for use by the processor 210. The communications interface 240 also sends data to the instrument 120 using the appropriate transmission protocol (e.g., IEEE 802.11b wireless protocol). One skilled in the art will note that the communications interface 240 can include data buffers, filters, or other logic needed to perform an interfacing function for the computing device 105.

1. Program Code Modules

Figure 3:
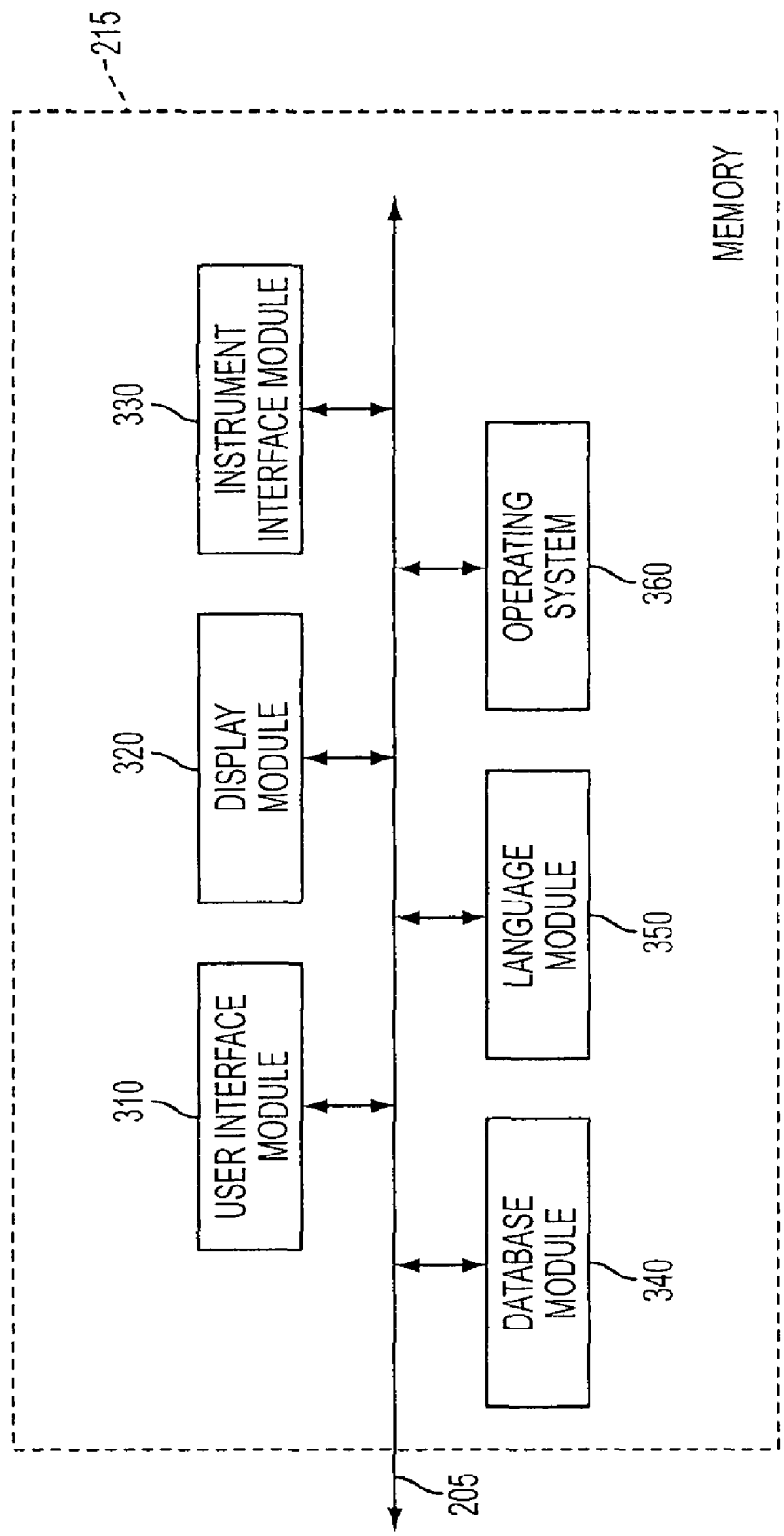
FIG. 3 illustrates program code modules for an embodiment of the present disclosure.

FIG. 3 illustrates program code modules for an embodiment of the present disclosure. The illustrated embodiment includes a user interface module 310, a display module 320, an instrument interface module 330, a database module 340, a language module 350, and an operating system module 360. The connection network 205 communicatively couples each of the modules 310, 320, 330, 340, 350, 360.

The modules 310, 320, 330, 340, 350, 360 include program instructions that can be executed on, for example, the processor 210 to implement the features or functions of the present disclosure. The modules 310, 320, 330, 340, 350, 360 are typically stored in a memory, such as the memory 215. As described above, the program instructions can be distributed on a computer readable medium or storage volume. The computer readable storage volume can be available via a public network, a private network, or the Internet. Program instructions can be in any appropriate form, such as source code, object code, or scripting code. One skilled in the art will recognize that arrangement of the modules 310, 320, 330, 340, 350, 360 represents one example of how the features or functionality of the present disclosure can be implemented.

The user interface module 310 includes display elements that can be presented on the display screen 107. The user interface module 310 assembles the display elements into navigational menus. A navigational menu is a list of user-selectable options. In one embodiment, the navigational menus include display elements that are related to a particular test suite of the instrument 120. For example, a flexible gas analyzer may have a navigational menu that includes display elements related to an "automatic tests" suite. One advantage of arranging the navigational menus by test suite is that it simplifies the operation of the instrument 120 for the technician, which results in more efficient use of the instrument 120.

The display module 320 receives coordinate information from the display screen 107 and communicates with the user interface module 310 about the screen location indicated by the coordinate information. That is, the display module 320 can determine whether a human user of the computing device 105 has touched, contacted, or otherwise applied pressure to a region of the display screen 107. The display module 320, in conjunction with the user interface module 310, can determine whether the coordinate information indicates that the user intends to invoke or to select a display element.

The instrument interface module 330 includes commands, protocol descriptions, data types, or other information used to send information to or receive information from the instrument 120. Of course, the instrument interface module 330 can include information about multiple instruments. The instrument interface module 330 can operate in conjunction with the display module 320 to invoke functions of the instrument 120. For example, the display module 320 can indicate to the instrument module 330 that a technician has selected (e.g., by touching corresponding portion of the display screen 107) a display element for a "Two-speed Idle" exhaust gas test. The instrument interface module 330 then sends (via the communications interface 240) the proper commands to a gas analyzer instrument to invoke the selected test.

The database module 340 includes functionality for storing and for retrieving customer information, test results, data received from the instrument 120, and the like. When performing a test, for example, the instrument 120 may provide a raw data stream of the measurements which the database module 340 records. Accordingly, the database module 340 can provide measurement data to the processor 210 for analysis.

The language module 350 provides localization features for the user interface. That is, the language module 350 is used to display text on the display screen 107 in the language that is appropriate for the country in which the computing device 105 is being used. In one embodiment, the language module 350 includes a library, database, or file with the text segments encoded in a single language. In another embodiment, the language module 350 includes text segments encoded in a plurality of languages. Although encoding the text segments in multiple languages increases the amount of storage space consumed, a benefit is that the language desired for the display screen 107 can be easily selected by the user.

The operating system module 360 represents a conventional operating system for a handheld or embedded device, such as Microsoft Windows CE (which is commercially available from Microsoft Corp., Redmond, Wash.). The operating system module 360 provides an application programming interface (API) through which the modules 310, 320, 330, 340, 350 or other application programs interact with the computing device 105. For example, the user interface module 310 calls a function of the operating system module 360 in order to display an element on the display screen 107.

2. User Interface

Figure 4:
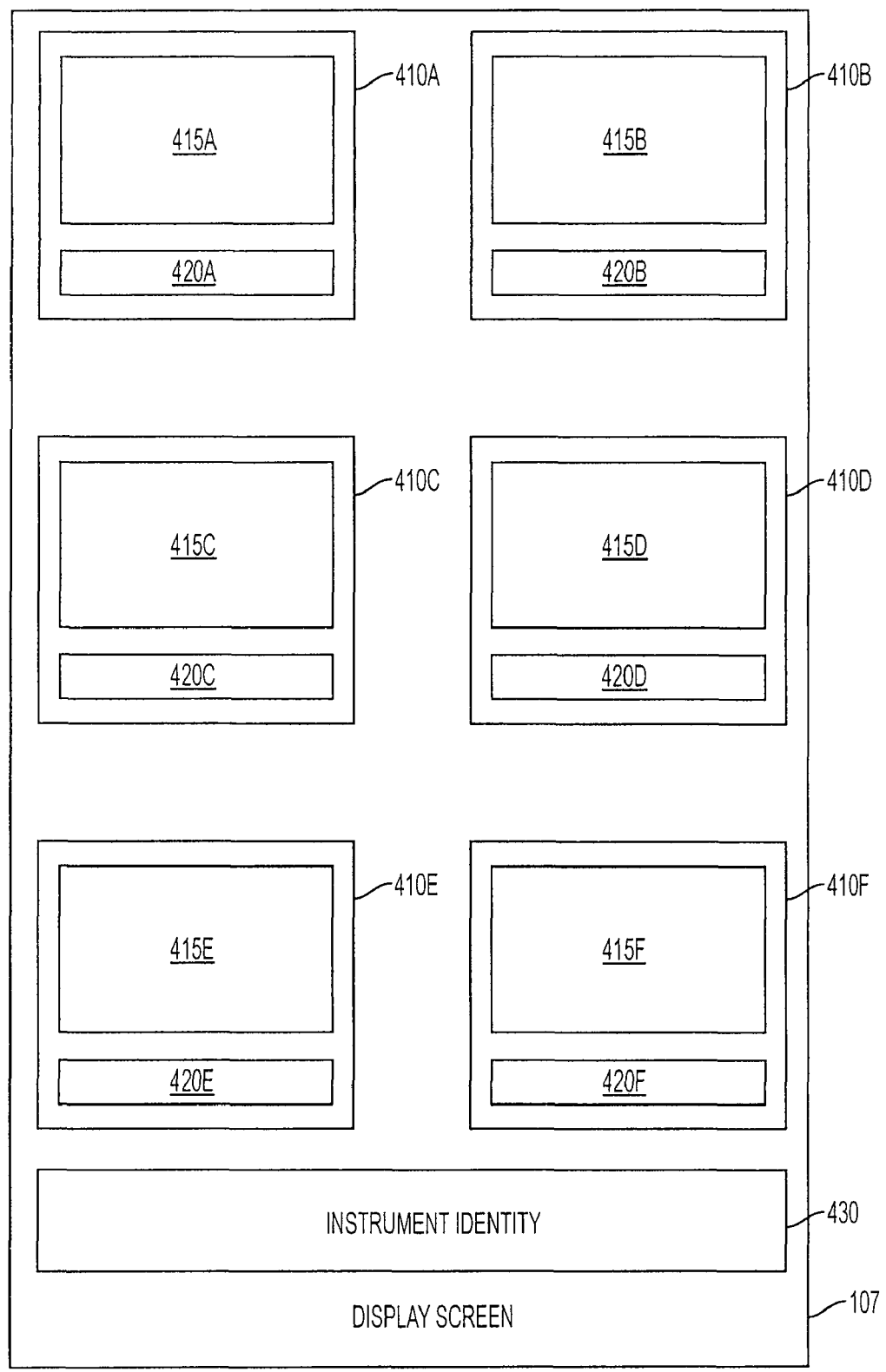
FIG. 4 illustrates a user interface according to an embodiment of the present disclosure.

FIG. 4 illustrates a user interface according to an embodiment of the present disclosure. The illustrated user interface includes several display elements identified by references "A" through "F" shown on the display screen 107. Each of the display elements "A"-"F" can include an active region 410, a graphical representation 415, and a textual description 420. The illustrated user interface also includes an instrument identity banner 430.

In one embodiment, the active region 410 represents the area of the display screen 107 that a user can contact in order to invoke or to select a display element "A"-"F." More specifically, active region 410A is the active region for display element "A." When a user's finger tip contacts the active region 410A, the computing device 105 invokes the functionality associated with display element "A," such as displaying a second navigational menu or sending data to the instrument 120.

The graphical representation 415 is an icon, bitmap image, or vector image. Typically the graphical representation 415 is displayed in color; however, a gray scale or black-and-white display screen 107 can also be used. The graphical representation 415 can be stored in the database 232, for example, and retrieved by the user interface module 310.

The textual description 420 typically includes a short description that corresponds with the graphical representation 415. For example, a display element for a "Meters" function includes a gauge icon accompanied by a description that reads "Meters." Although it is expected that users will become familiar with the graphical representations 415, the textual description 420 can provide additional guidance to understanding the graphical representations 415. In one embodiment, the textual description 420 is not displayed with each display element "A"-"F." This can provide additional screen area for graphical representations 415 if necessary.

In one embodiment, the display screen 107 is touch sensitive across essentially the whole display screen 107 area. Therefore, the active regions 410A-F are not limited to particular locations on the display screen 107 and can be placed in many suitable configurations. The active regions 410A-F correspond with the screen locations where the user interface module 310 places the display elements "A"-"F." The active region 410 advantageously includes more screen area than the corresponding graphical representation 415 and textual description 420 in order to have some spatial flexibility in the user contact area. For example, a technician may be wearing hand protection while operating the computing device 105. The technician's finger tip may thus contact the area just outside of the graphical representation 415B when he or she intends to invoke or to select display element "B." Therefore, the active regions 410A-F should be sized and positioned so as to enable discrete selection of each of the display elements "A"-"F."

As will be appreciated by one skilled in the art, embodiments of the disclosure include active regions 410 of various sizes and shapes. Typically, the size of a human finger tip requires an approximately circular active region 410 of at least ⅜ inch in diameter. A gloved human finger tip may require an approximately circular active region 410 of at least ½ inch in diameter. The active region 410 can also be polygonal (e.g., rectangular) having a predetermined area or be proportional to the size of the display screen 107. More specifically, the active region 410 for a given display element may be at least 1/10 that of the display screen 107 area.

The instrument identity banner 430 can include, for example, details about the type and status of the instrument 120. Status information may include the state of consumable supplies within the instrument 120. Status information may further include the progress of a particular test. In an embodiment where the instrument 120 is a vehicle's onboard diagnostics, the instrument identity banner 430 may include the vehicle's identification number, information about the vehicle's capabilities, and the like.

Figure 5:
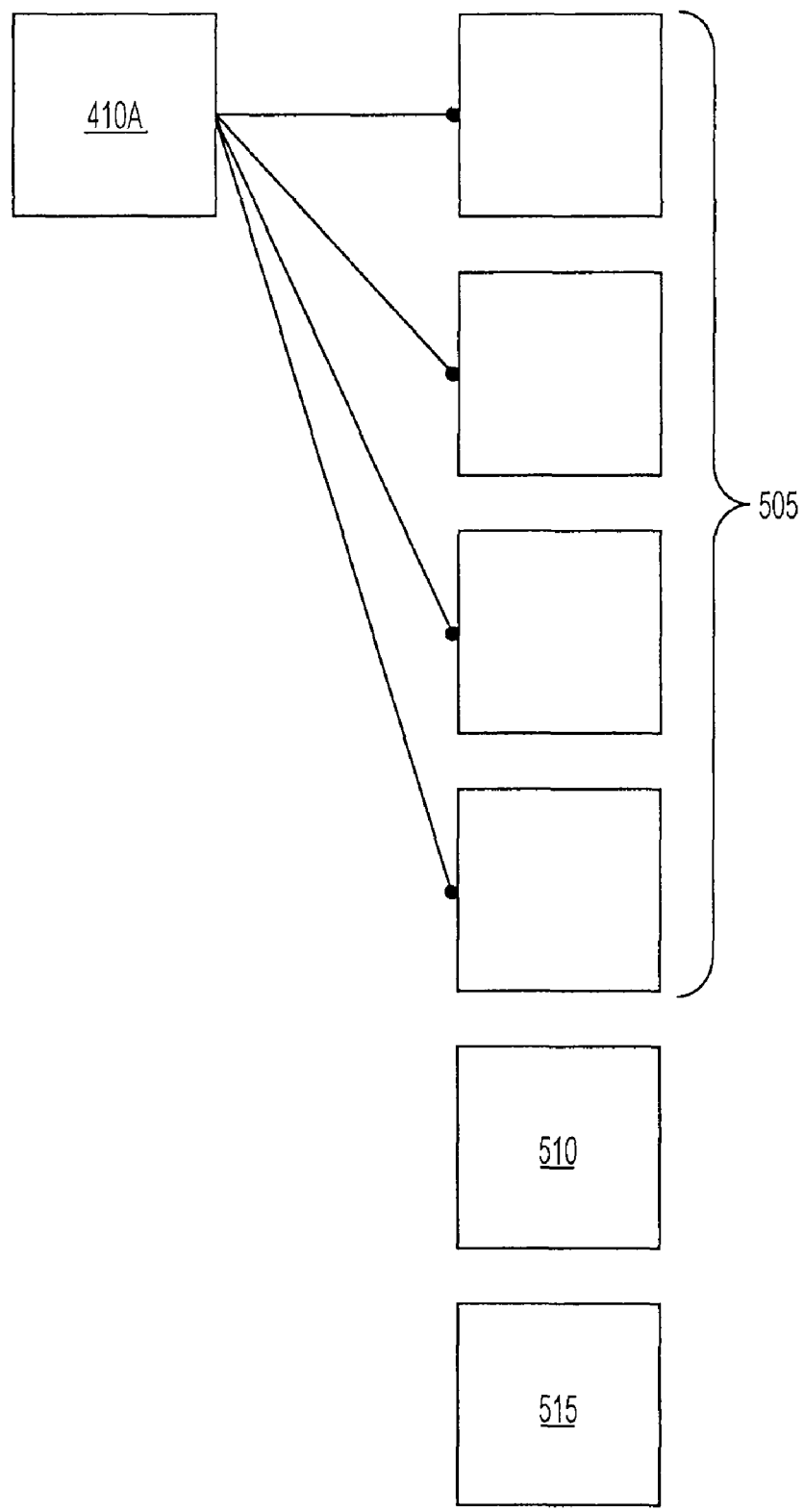
FIG. 5 is a diagram illustrating an exemplary configuration of user interface display elements according to an embodiment of the present disclosure.

FIG. 5 is a diagram illustrating an exemplary configuration of user interface display elements according to an embodiment of the present disclosure. In the illustrated embodiment, display element "A" of a first navigational menu is shown mapping to or corresponding to a selection group 505. The items of the selection group 505 can represent a test suite of the instrument 120. In one embodiment, the options of the test suite are displayed as a second navigational menu. Specifically, when the user selects display element "A" a second navigational menu is presented in place of the first navigational menu on the display screen 107.

In the illustrated exemplary embodiment, the second navigational menu also includes two additional display elements: a "back" display element 510 and a "home" display element 515. Selecting the "back" display element 510 returns to the previously displayed screen. Selecting the "home" display element 515 returns to the main navigational menu. In one embodiment, the display elements of the selection group 505 change responsive to the particular display element selected or invoked on a first navigational menu. That is, the composition of options presented on the second navigational menu depends upon the user's display element selection on a first navigational menu. However, the presentation of the "back" display element 510 and the "home" display element 515 may be independent of the user's selection on the first navigational menu.

In one embodiment, the selection group 505 includes fewer than ten display elements to permit discrete touch sensitive selection of each of the ten display elements. Of course, the number of discretely operable display elements depends, for example, on the size of the display screen 107.

C. Operating a Diagnostic Instrument

Figure 6:
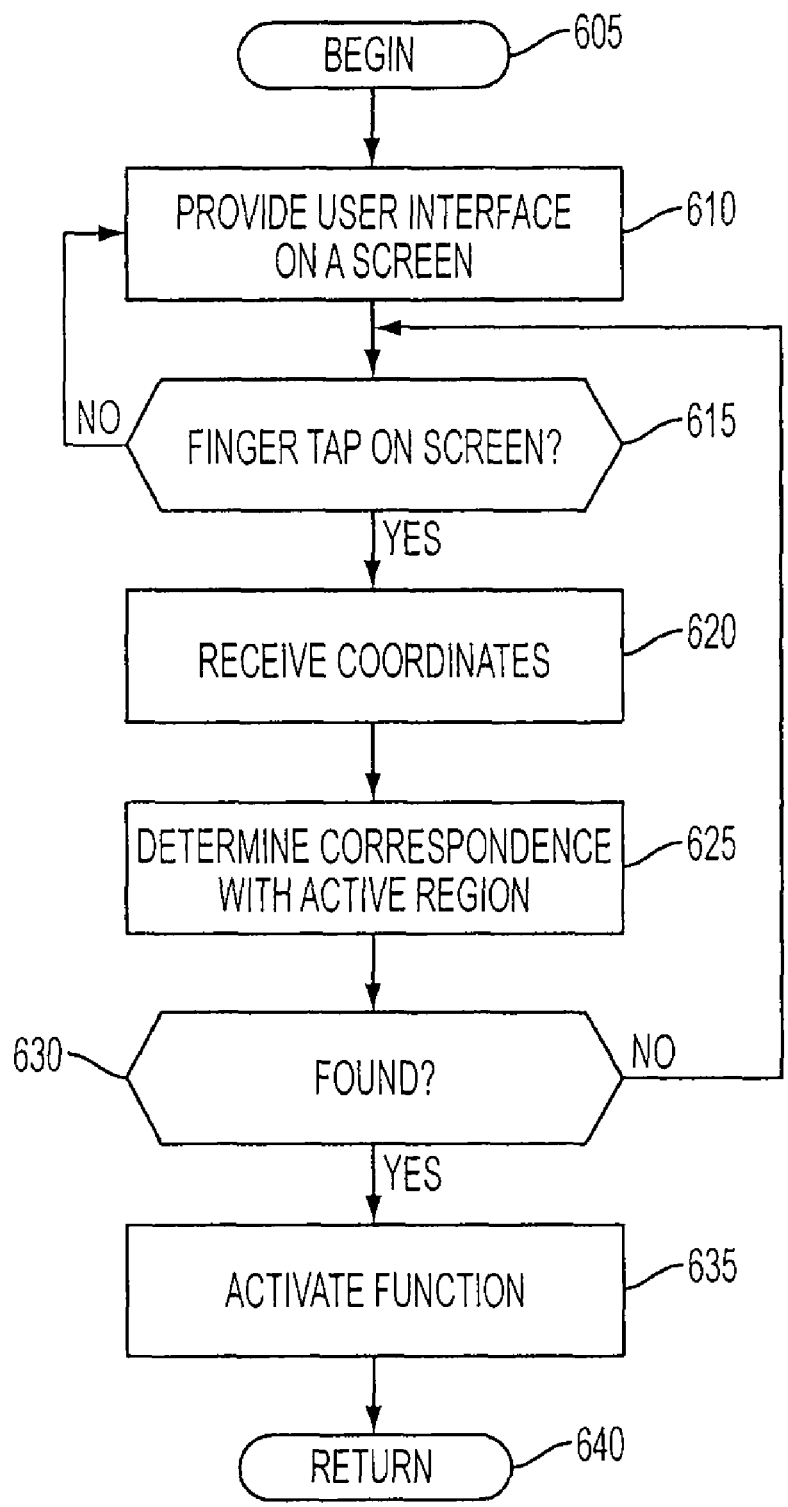
FIG. 6 is a flowchart illustrating a user interface method according to an embodiment of the present disclosure.

FIG. 6 is a flowchart illustrating a user interface method according to an embodiment of the present disclosure. The illustrated method begins 605 by providing 610 a user interface on a display screen 107. As described in further detail above, the user interface can include a plurality of display elements having active regions.

The method then determines 615 whether a finger tip has contacted an active region for one of the display elements. If no contact is detected, then the method returns to step 610. Otherwise, the method proceeds to receive 620 coordinate information. The coordinate information describes the location on the display screen 107 at which the contact occurred.

The method determines 625 whether the coordinate information corresponds to an active region. If the method finds 630 an active region at the location described by the coordinate information, the corresponding function is activated 635 or performed. After the function is activated 635, the method returns 640 to the calling process.

For example, if the display element is navigational, another navigational menu may be displayed in step 635. Alternatively, if the display element is part of an instrument 120 test suite, a command is sent to the instrument 120 to begin the test. If no corresponding active region is found 630, the method returns to step 615.

Having described embodiments of user interface for diagnostic instrument (which are intended to be illustrative and not limiting), it is noted that modifications and variations can be made by persons skilled in the art in light of the above teachings. It is therefore to be understood that changes may be made in the particular embodiments disclosed that are within the scope and spirit of the disclosure as defined by the appended claims and equivalents.

What is claimed is:

1. A non-transitory computer-readable storage medium for storing instructions for invoking a function of a diagnostic instrument, the code, once executed, causing the instrument to display:

a first navigational menu including at least one display element, the at least one display element having a touch sensitive active region therein and a graphical representation of functionality invoked via user selection of the display element by user contact with the touch sensitive active region, the display element and the touch sensitive active region being located on the same surface of a display screen of the diagnostic instrument; and a second navigational menu configured to be displayed responsive to contact on the touch sensitive active region of the at least one display element, the second navigational menu including a selection group related to a test suite of the diagnostic instrument;

wherein the first and second navigational menus are displayed sized and positioned to be responsive to a gloved finger; and wherein the display screen is pressure sensitive and provides coordinate information regarding contact on the display screen including depth information, the depth information is used to determine a pressure applied to the display screen, and the pressure is used to define a user contact area.

2. The medium of claim 1, wherein the selection group includes a plurality of display elements, each of the plurality of display elements having a touch sensitive active region to enable user selection of the plurality of display elements.

3. The medium of claim 1, wherein the selection group includes fewer than ten display elements to permit discrete touch sensitive selection of each of the fewer than ten display elements.

4. The medium of claim 1, wherein the first navigational menu includes at least six display elements, each of the at least six display elements having a discrete touch sensitive active region sized to permit finger tip selection.

5. The medium of claim 1, wherein the at least one display element comprises a textual description of functionality invoked by user selection of the display element.

6. The medium of claim 1, wherein the touch sensitive active region comprises an approximately circular shape with a diameter of at least ⅜ inch.

7. The medium of claim 1, wherein the touch sensitive active region comprises an area having a polygonal shape of at least ¼ square inch.

8. The medium of claim 1, wherein the touch sensitive active region comprises an area of at least 1/10 that of the screen area.

\* \* \* \* \*